United States Patent [19]

Okawa

[11] Patent Number: 4,866,017

[45] Date of Patent: Sep. 12, 1989

[54] DIELECTRIC CERAMIC COMPOSITION OF MATTER

[75] Inventor: Takashi Okawa, Kagoshima, Japan

[73] Assignee: Kyocera Corporation, Kyoto, Japan

[21] Appl. No.: 158,026

[22] Filed: Feb. 12, 1988

Related U.S. Application Data

[63] Continuation of Ser. No. 840,431, Mar. 17, 1986, abandoned.

[30] Foreign Application Priority Data

Mar. 18, 1985 [JP] Japan .................................. 60-55544

[51] Int. Cl.$^4$ .............................................. C04B 35/46
[52] U.S. Cl. ..................................... 501/139; 361/321
[58] Field of Search ............................... 501/134–139; 361/320, 321

[56] References Cited

FOREIGN PATENT DOCUMENTS

| 88009 | 9/1983 | European Pat. Off. | 501/139 |
| 2848693 | 5/1979 | Fed. Rep. of Germany | 501/136 |
| 2505321 | 11/1982 | France | 501/139 |
| 2508436 | 12/1982 | France | 501/137 |
| 56-102003 | 8/1981 | Japan | 501/135 |
| 57-32504 | 2/1982 | Japan | 501/139 |
| 57-61667 | 4/1982 | Japan | 501/139 |
| 57-65605 | 4/1982 | Japan | 501/139 |
| 57-80603 | 5/1982 | Japan | 501/139 |
| 59-214105 | 12/1984 | Japan | 501/134 |
| 596557 | 3/1978 | U.S.S.R. | 501/135 |
| 1431103 | 4/1976 | United Kingdom | 501/139 |

Primary Examiner—Mark L. Bell
Assistant Examiner—David M. Brunsman
Attorney, Agent, or Firm—Spensley Horn Jubas & Lubitz

[57] ABSTRACT

A dielectric ceramic composition of matter consisting essentially of a range of composition wherein the composition formula represents $xBaO \cdot yNd_2O_3 \cdot zTiO_2 \cdot wBi_2O_3$ wherein $0.110 \leq x \leq 0.170$, $0.120 \leq y \leq 0.180$, $0.630 \leq z \leq 0.685$, $0.020 \leq w \leq 0.090$, and $x+y+z+w=1$. The composition of matter provides the advantage that it is high in dielectric constant, small in dielectric loss in high frequency and small in change with respect to temperature of resonance frequency.

2 Claims, No Drawings

DIELECTRIC CERAMIC COMPOSITION OF MATTER

This is a continuation of Ser. No. 840,431 filed Mar. 17, 1986, now abandoned.

BACKGROUND OF THE INVENTION

1. Field of the Invention

This invention relates to a dielectric ceramic composition of matter and more particularly to a dielectric ceramic composition of matter of a novel ceramic composition, especially a composition of matter useful for a resonator, substrate and the like as a dielectric ceramic in the microwave frequency band.

2. Prior Art

In recent years, dielectric ceramics have found wide application in the microwave frequency band such as in the development of a microwave circuit into use of integrated circuit along with the practical use of an automobile telephone, cordless telephone, personal radio set, and satellite broadcast receiver; in the increased range of use of Gunn oscillator; and in use for gallium arsenide field-effect transistor (GaAs FET) driven oscillator and the like.

Such a dielectric ceramic for microwave use is chiefly used in an oscillator, and characteristic features demanded of the oscillator are included under the following three characteristics that (1) the dielectric ceramic should have the highest possible dielectric constant because, in the dielectric, the wave length is shortened to $1/\sqrt{\epsilon r}$ (wherein $\epsilon r$ represents a dielectric constant) and because a ceramic larger in dielectric constant facilitates so much the greater reduction in size if the ceramic is the same in resonance frequency; (2) the ceramic should be small in dielectric loss with respect to high frequency; and (3) it should be small in its resonance frequency change according to temperature, namely, small and stable in the dependency of its dielectric constant upon temperature. And if a resonator is on the order of 1 GHz considered to be in a low-frequency band even in the microwave frequency band, the wavelength to be applied to the low-frequency band is considerably increased in wavelength, and accordingly miniaturization of the resonator needs considerably high dielectric constant.

Heretofore, it is known that the dielectric ceramics of the type described above are, for example, a BaO—$TiO_2$ based material; BaO—ReO—$TiO_2$ based material (wherein ReO represents an oxide of rare-earth element and the same shall be applied hereinafter); and (BaSrCa) ($ZrTi$)$O_3$ based material and so on.

But while BaO—$TiO_2$ based material and (BaSrCa) (ZrTi) $O_3$ based material each has an excellent dielectric loss in a microwave frequency band of 4–10 GHz, they are as low in dielectric constant as 29–40, and particularly miniaturization of the resonator in a frequency band of the order of 1 GHz poses a problem in point of practical use. An increase in dielectric constant tends to extremely deteriorate temperature characteristic or dielectric loss of resonance frequency.

On the other hand, systematic experiment reports on the BaO—ReO—$TiO_2$ based material [R. L. Bolton "Temperature Compensating Ceramic Capacitors in the System Baria-Rare Earth Oxide-Titania" Ph.D. Thesis, University of Illinois-Urbana, 1968 and Drago Kolar et al., Ber., Deutsche Keram. Ges., 55. 346–348 (1978) ] are available. The reports are all based on the measurement made at 1 MHz and no application of the material in a microwave frequency band of the order of 1 GHz was contemplated. When the material is used in the form of a dielectric oscillator, the dielectric material is as high in dielectric constant as 70–80 and also small in dielectric loss, but is so very high in the temperature coefficient of dielectric constant as N 100–N 150 ppm/°C. (N represents negative) on the N side, and the temperature coefficient $\tau f$ of resonance frequency becomes high on the P (positive) side. For example, when the oscillator is used in a band pass filter as of a personal radio set, a transmitting and receiving band deflects from a specified frequency band because of a temperature change and enters the adjacent frequency band, with the result that it becomes difficult to send and receive signals, posing a problem in point of practical use. Also even if the amount of $Nd_2O_3$ is for example increased to modify $\tau f$ to NPO (in the direction of O), the dielectric material is subject to reduced dielectric constant and increased dielectric loss. Accordingly, the dielectric ceramic composition of matter for use in microwaves having the above-mentioned three characteristics has not yet been developed.

SUMMARY OF THE INVENTION

This invention has been worked out in view of the disadvantages described above, and is intended to provide a dielectric ceramic composition of matter high in dielectric constant (more than 70), as low in dielectric loss as possible, small and stable in the temperature dependence of dielectric constant, and small and stable in the temperature dependency of resonance frequency.

The object of the invention can be achieved by a dielectric ceramic composition of matter being made in such manner that $Nd_2O_3$ is substituted for ReO of the BaO-ReO-$TiO_2$ based material and $Bi_2O_3$ is added to the material to improve the temperature characteristic of the material (the temperature characteristic of dielectric constant is shifted to the P side, namely when the material is used to make a dielectric resonator, the temperature coefficient $\tau f$ of resonance frequency is shifted to the N side) and which is in the range of composition of

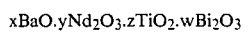

$$xBaO \cdot yNd_2O_3 \cdot zTiO_2 \cdot wBi_2O_3$$

wherein $0.110 \leq x \leq 0.170$, $0120 \leq y \leq 0.180$, $0.630 \leq z \leq 0.685$, $0.020 \leq w \leq 0.090$, and $x+y+z+w=1$.

In the composition of matter constructed as above, $Bi_2O_3$ constitutes $BiTi\frac{3}{4}O_3$ together with $TiO_2$ and functions to transfer the temperature characteristic of dielectric constant to the P side. Accordingly, the above composition of matter is used to make a dielectric resonator, the temperature coefficient $\tau f$ of resonance frequency is transferred to the N side to make it possible also that $\tau f=0$. And dielectric loss is also held very small. Further, dielectric constant increases along with an increase in the amount of addition of $Bi_2O_3$ and is positively assured of more than 70 to enable further miniaturization of a resonator and like devices.

Now, a description will be given of problems which emerge when the x, y, z and w of the above composition formula are outside the scope of the invention. Namely, when $x>0.170$, the temperature coefficient $\tau f$ of resonance frequency is increased on the P side or else dielectric loss is increased.

When $x<0.110$, dielectric loss is increased.

When y>0.180, dielectric constant is reduced and $\tau f$ is increased on the N side or dielectric loss is increased.

ture coefficient of resonance frequency. The results of measurement are shown in Table 1.

TABLE I

| Sample No. | Composition | | | | Dielectric constant ($\epsilon_r$) | Dielectric loss (tan $\delta$) | Temp. coefficient of resonance frequency $\tau_f$ (ppm/°C.) |
|---|---|---|---|---|---|---|---|
| | x | y | z | w | | | |
| *1  | 0.101 | 0.152 | 0.671 | 0.076 | 91.2  | $1.58 \times 10^{-3}$ | +24.9 |
| 2   | 0.110 | 0.165 | 0.685 | 0.040 | 82.4  | $6.56 \times 10^{-4}$ | −15.2 |
| 3   | 0.117 | 0.176 | 0.682 | 0.025 | 79.4  | $4.99 \times 10^{-4}$ | −12.1 |
| 4   | 0.116 | 0.156 | 0.638 | 0.090 | 87.0  | $7.49 \times 10^{-4}$ | +6.6 |
| 5   | 0.133 | 0.133 | 0.653 | 0.081 | 108.3 | $8.33 \times 10^{-4}$ | +10.5 |
| 6   | 0.138 | 0.138 | 0.655 | 0.069 | 102.9 | $7.06 \times 10^{-4}$ | +8.3 |
| 7   | 0.142 | 0.142 | 0.657 | 0.059 | 98.3  | $5.97 \times 10^{-4}$ | +0.5 |
| 8   | 0.146 | 0.146 | 0.659 | 0.049 | 94.1  | $5.23 \times 10^{-4}$ | −4.7 |
| 9   | 0.150 | 0.150 | 0.660 | 0.040 | 91.6  | $4.74 \times 10^{-4}$ | −2.1 |
| 10  | 0.153 | 0.153 | 0.661 | 0.033 | 89.1  | $4.30 \times 10^{-4}$ | +3.1 |
| 11  | 0.156 | 0.156 | 0.662 | 0.026 | 86.8  | $3.97 \times 10^{-4}$ | +4.9 |
| 12  | 0.158 | 0.158 | 0.664 | 0.020 | 85.7  | $3.70 \times 10^{-4}$ | +8.0 |
| 13  | 0.170 | 0.140 | 0.650 | 0.040 | 95.3  | $7.96 \times 10^{-4}$ | +6.8 |
| *14 | 0.181 | 0.135 | 0.645 | 0.039 | 101.7 | $4.24 \times 10^{-3}$ | +12.2 |
| *15 | 0.113 | 0.113 | 0.690 | 0.084 | 110.0 | $1.85 \times 10^{-3}$ | +13.6 |
| 16  | 0.155 | 0.120 | 0.674 | 0.051 | 97.3  | $6.55 \times 10^{-4}$ | +12.1 |
| 17  | 0.161 | 0.161 | 0.644 | 0.034 | 72.1  | $5.81 \times 10^{-4}$ | +1.5 |
| 18  | 0.111 | 0.180 | 0.682 | 0.027 | 83.5  | $5.24 \times 10^{-4}$ | −9.3 |
| *19 | 0.139 | 0.185 | 0.646 | 0.030 | 65.7  | $2.13 \times 10^{-3}$ | −5.4 |
| *20 | 0.148 | 0.148 | 0.593 | 0.111 | 55.2  | $8.06 \times 10^{-3}$ | +115.8 |
| 21  | 0.155 | 0.165 | 0.630 | 0.050 | 82.1  | $7.95 \times 10^{-4}$ | −5.6 |
| *22 | 0.133 | 0.133 | 0.706 | 0.028 | 102.2 | $2.33 \times 10^{-2}$ | −442.0 |
| *23 | 0.163 | 0.163 | 0.665 | 0.009 | 85.8  | $3.30 \times 10^{-4}$ | +23.7 |
| *24 | 0.127 | 0.127 | 0.651 | 0.095 | 116.7 | $1.06 \times 10^{-3}$ | +13.0 |
| *25 | 0.167 | 0.167 | 0.666 | 0     | 86.8  | $3.39 \times 10^{-4}$ | +57.2 |

Note:
*indicated sample Nos. designate dielectric compositions of matter which are outside the scope of the invention.

When Y<0.120, dielectric loss is increased and $\tau f$ is increased on the P side.

When z>0.685, $\tau f$ is increased on the P side or is exceedingly increased on the N side and dielectric loss is also increased.

When z<0.630, $\tau f$ is increased on the P side and dielectric loss is also increased and dielectric constant is reduced.

When w>0.090, dielectric loss is increased and $\tau f$ becomes instabile ($\tau f$ deflects to the P side or N side).

When w<0.020, $\tau f$ is increased on the P side.

EXAMPLES

Examples will be described in the following.

(i) Preparation of dielectric ceramics.

(i-a) High purity barium carbonate ($BaCO_3$), neodymium oxide ($Nd_2O_3$), titanium oxide ($TiO_2$) and bismuth oxide ($Bi_2O_3$) were weighed at a ratio of x, y, z and w shown in Table 1, respectively.

(i-b) The above starting material was subjected to wet mixing by a ball mill around the clock and was dried.

(i-c) The mixture thus obtained was calcined at 900° C. for two hours. $Bi_2O_3$ was substantially added to the interrelated group of $BaO-Nd_2O_3-TiO_2$ in the form of $BiTi_4^3O_3$ by the calcination.

(i-d) The calcined mixture was subjected to wet crushing by a ball mill around the clock.

(i-e) About one % by weight of binder was added to the dried powder thus obtained and was uniformed in grain size.

(i-f) The powder was then molded under a pressure of about 800 kg/cm² and fired at 1200°–1450° C. in the air for about two hours.

(ii) The dielectric ceramics thus obtained were measured in the band of resonance frequency of 500–600 MHz by a re-entrant resonator method with reference to the dielectric constant, dielectric loss, and tempera- As appreciated from Table 1, in the scope of the invention, the dielectric ceramic is as high in dielectric constant as 72.1–108.3 and is so very low also in dielectric loss as $8.33 \times 10^{-4}$–$3.70 \times 10^{-4}$. Furthermore, the temperature coefficient of resonance frequency is in the range of +12.1–15.2, and is small in its absolute value and is effectively modified to NPO. Outside the scope of the invention (*-indicated samples), the dielectric ceramics are great in dielectric loss and some of them are as great as $2.33 \times 10^{-2}$ at a maximum. Furthermore, they are great also in the absolute value of temperature coefficient $\tau f$ of resonance frequency and some of them indicate −442.0 ppm/°C. Accordingly, when the dielectric ceramics which are outside this scope are used to make a dielectric resonator, the resonator is unable to have the three required characteristics and may be deemed unstabile. For example, while examples Nos. 14 and 15 are, in point of $\epsilon r$, within the scope of $\epsilon r$ of the invention, tan $\delta$ and $\tau f$ are outside the range of tan $\delta$ and $\tau f$ of the invention. The same may be said of sample Nos. 23 and 25.

From the above it will be appreciated that the dielectric ceramic composition of matter of the invention fully satisfies the three characteristics demanded of dielectric ceramics for microwaves and since it positively guarantees more than 70 for dielectric constant, miniaturization of a dielectric resonator becomes fully possible.

Incidentally, it will also be readily understood from Table 1 that x, y, z and w are preferably $0.141 < x < 0.157$, $0.141 < y < 0.157$, $0.656 < z < 0.663$ and $0.025 < w < 0.060$.

As described above, the dielectric ceramic composition of matter has been obtained by substituting $Nd_2O_3$ for ReO of $BaO-ReO-TiO_2$ based material, adding $Bi_2O_3$ to the material to improve the temperature characteristic of the material, and then determining a proper range of composition and has increased a dielectric constant, reduced a dielectric loss, and has made it effective to modify NPO of the temperature coefficient of resonance frequency, thus fully satisfying the three characteristics demanded of dielectric ceramics for microwaves and rendering it sufficiently possible to miniaturize a resonator or like devices displaying resonance of the order of 1 GHz.

Incidentally, the dielectric ceramic composition of matter of the invention can be used not only in the resonator but also in a dielectric substrate for microwave circuit elements, dielectric wired waveguide circuit for microwaves, etc.

What is claimed:

1. A dielectric resonator for microwaves comprising a dielectric ceramic composition of matter consisting essentially of $$xBaO \; yNd_2O_3 \; zTiO_2 \; wBi_2O_3$$

wherein $0.141 < x < 0.157$, $0.141 < y < 0.157$, $0.656 < z < 0.663$ and $0.025 < w < 0.060$, and $x+y+z+w$ equals 1, such that in the band of resonance frequency of 500–600 MHz by a re-entrant resonator method, the resonator has a temperature coefficient of resonance frequency within the range from $-4.7$ to $+4.9$, dielectric constant greater than 86.8 and dielectric loss less than $5.97 \times 10^{-4}$.

2. A dielectric substrate for microwave circuit elements comprising a dielectric ceramic composition of matter consisting essentially of $$xBaO \; yNd_2O_3 \; 2TiO_2 \; wBi_2O_3$$

wherein $0.141 < x < 0.157$, $0.141 < y < 0.157$, $0.656 < Z < 0.663$ and $0.025 < w < 0.060$, and $x+y+z+w$ equals 1, such that in the band of resonance frequency of 500–600 MHZ by a re-entrant resonator method, the resonator has a temperature coefficient of resonance frequency within the range from $-4.7$ to $+4.9$, dielectric constant greater than 86.8 and a dielectric loss less than $5.97 \times 10^{-4}$.

* * * * *